Oct. 13, 1942.    M. F. JOY ET AL    2,298,298
ELECTRICALLY HEATED GARMENT
Filed Oct. 7, 1941    3 Sheets-Sheet 1
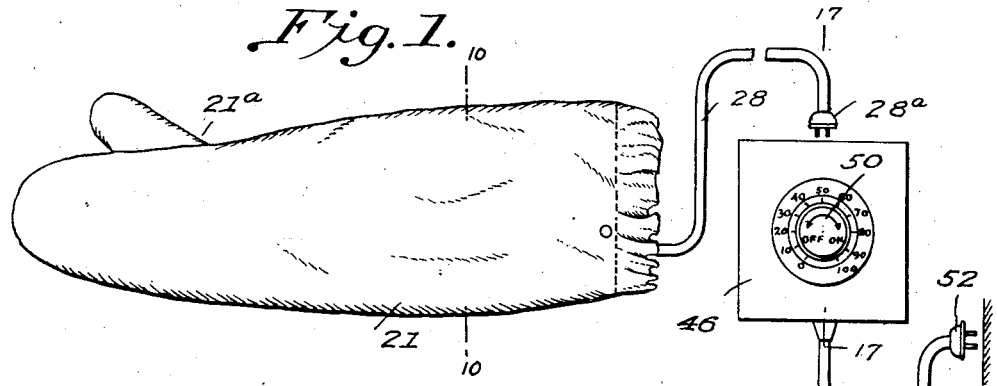
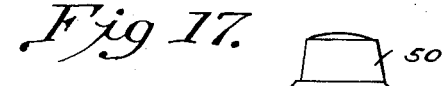
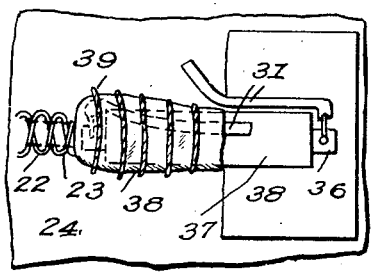
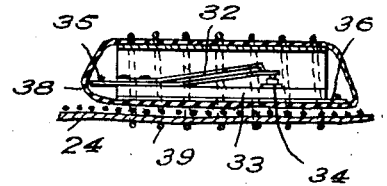
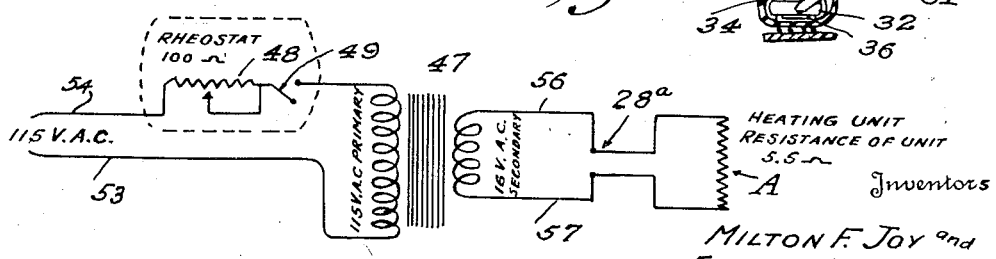
Inventors
MILTON F. JOY and
ERNEST E. SHEPARDSON
By
Milans & Milans
Attorneys

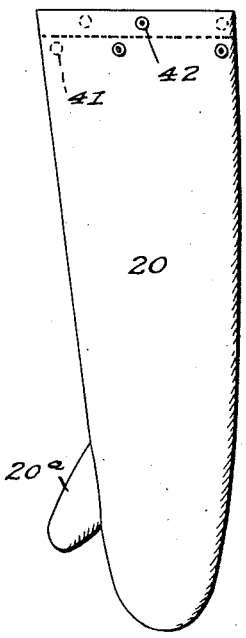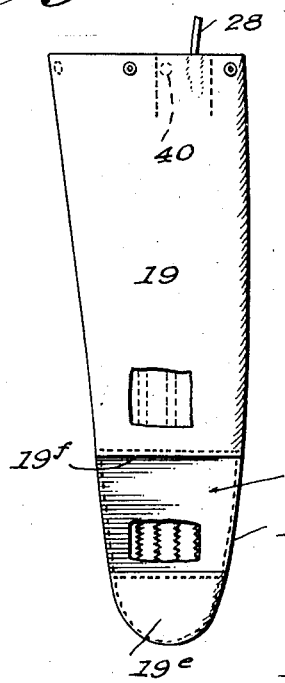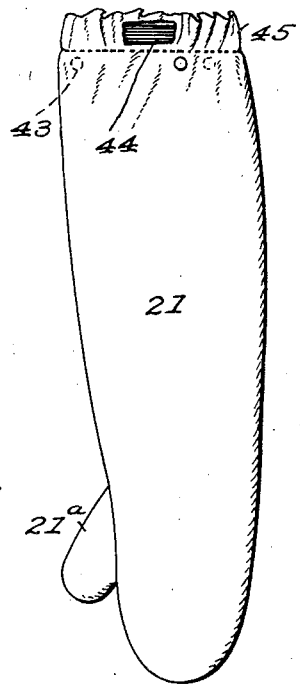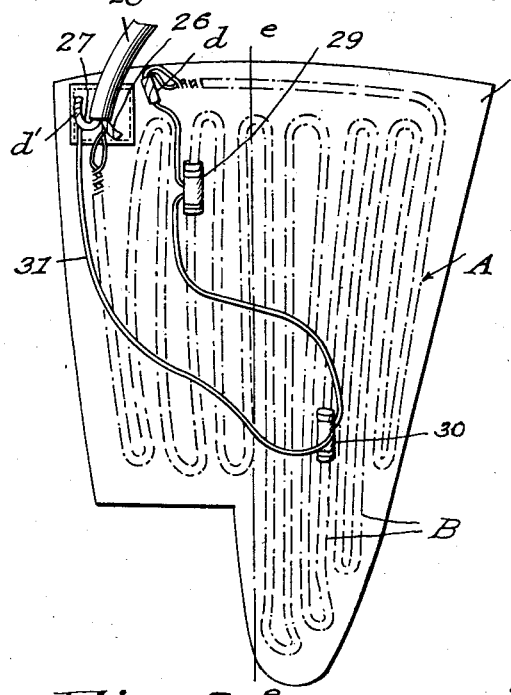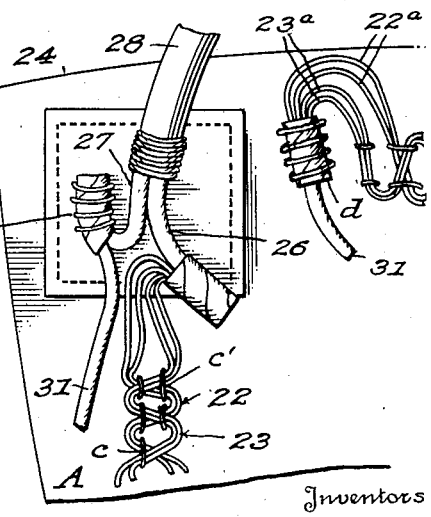

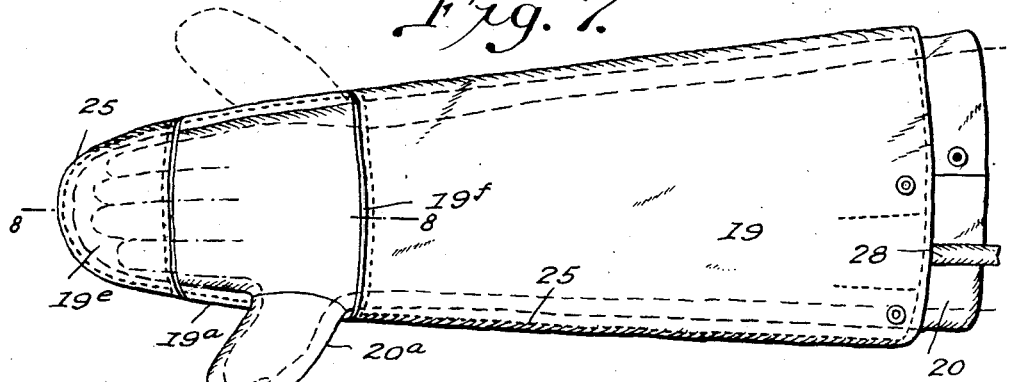
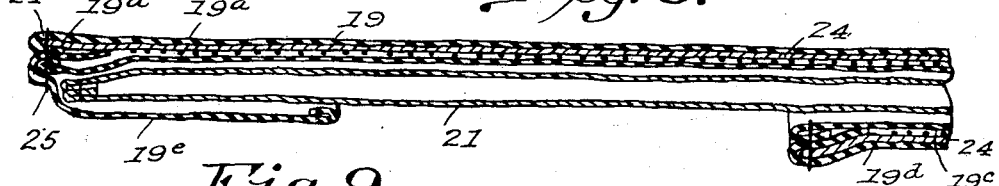
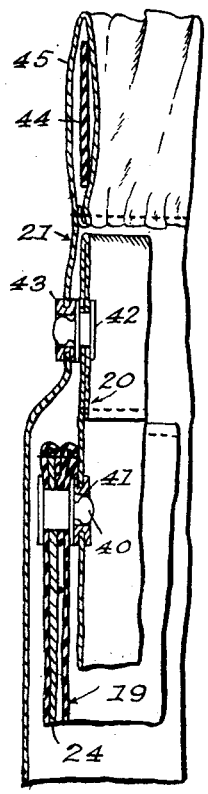
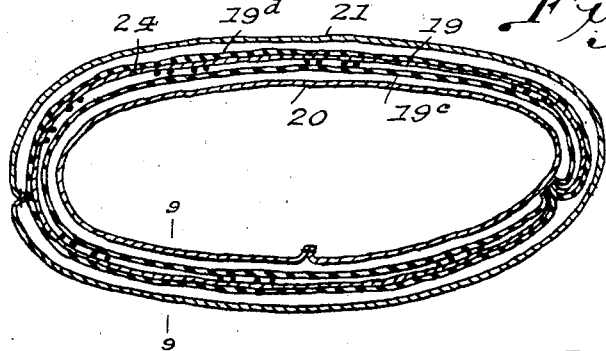
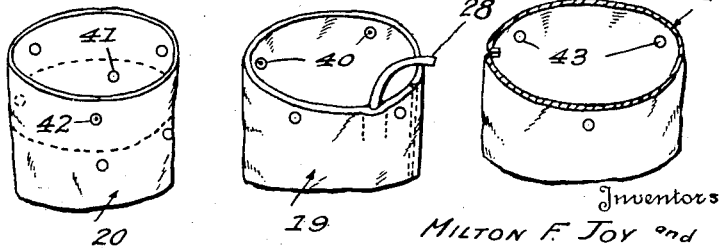

Patented Oct. 13, 1942

2,298,298

UNITED STATES PATENT OFFICE 2,298,298

ELECTRICALLY HEATED GARMENT

Milton F. Joy, Green Island, N. Y., and Ernest E. Shepardson, East Providence, R. I., assignors to Colvinex Corporation, New York, N. Y., a corporation of New York Application October 7, 1941, Serial No. 414,020

7 Claims. (Cl. 219—46)

This invention relates to improvements in electrically heated garments and more especially to a sleeve and hand covering particularly adapted for therapeutic purposes.

An object of the invention is to provide an electrically heated sleeve and hand covering that will fit comfortably on the arm and hand of the patient, that will apply the desired heat over selected areas, and which will be efficient and safe in operation.

Other objects of the invention are to provide a garment of the character referred to that can be be easily applied and removed, that will remain in proper position during treatment to apply heat over the areas desired while permitting freedom of movement of the hand and fingers, that will be reversible for use on either hand and arm, and that will be durable and so constructed as to be easily kept in a sanitary condition.

A further object of the invention is to provide a garment of the character referred to having an electric heating unit so formed as to coact in a special way with a thermostatic element, which with other circuit controlling means will act to effect a close control of a predetermined temperature and thereby maintain the heat of the garment at a constant temperature.

The invention comprehends a sleeve having a hand covering extension and comprising three separable sections, a tubular double-walled waterproof section within which between the opposing walls thereof is disposed the electric heating unit, an outer covering section and an inner lining section, the several sections telescoping with each other. The intermediate tubular double-walled waterproof section that provides a protective casing for the heating unit is formed open at the palm side of its hand covering portion except for a finger pocket at its lower end, the opening at the palm side extending from said pocket to the wrist portion. This construction of the hand covering portion of the intermediate double-walled section formed open at its palm side avoids excessive thickness of material at the palm that would interfere with the free flexing of the hand and the gripping of objects when the garment is in use. The inner lining section and the outer covering section are each provided with a thumb pocket projecting laterally from one side edge thereof.

The thumb pockets telescope with each other, the thumb pocket of the inner lining section projecting through the opening at the palm side of the intermediate section adjacent the transversely extending edge portion at the upper edge of said opening, this interfitting of the parts in conjunction with the lower finger pocket providing means for maintaining the back of the hand covering portion of the intermediate section with the heating means therein in proper position relatively to the back of the hand. Means is also provided at the upper end portions of the sleeve sections for detachably connecting the intermediate section to the inner lining section, and the latter to the outer covering section, together with an elastic band around the upper marginal portion of the outer covering section for securing the same around the arm of the patient and holding the three sections in place thereon. These means as will be understood, also cooperate with the interfitting hand covering structure before mentioned to maintain the hand covering portion of the intermediate section with the heating means therein in proper position over the back of the hand and the backs of the fingers.

The invention, with other objects and advantages thereof, and the particular construction, combination and arrangements of parts comprising the same will be understood from the hereinafter contained detailed description when considered in connection with the accompanying drawings forming part hereof and illustrating one embodiment of the invention.

In the drawings:

Figure 1 is a top plan view of a complete device constructed in accordance with the present invention.

Figs. 2, 3 and 4 are detail plan views of the inner lining section, the intermediate section, and the outer covering section respectively of the garment.

Fig. 5 shows diagrammatically the arrangement of the conductor wires of the heating unit on the flexible supporting sheet and also the arrangement of the thermostats.

Fig. 6 is a detail view, on an enlarged scale, of an upper corner portion of the supporting sheet for the heating unit, showing more in detail the heating unit structure and the terminal connections of the same.

Fig. 7 is a plan view of the intermediate section and the inner lining section of the garment assembled.

Fig. 8 is an enlarged vertical section taken on the line 8—8 of Figure 7.

Fig. 9 is a fragmentary vertical section on the line 9—9 of Figure 10.

Fig. 10 is a horizontal section, on an enlarged scale, taken on the line 10—10 of Figure 1.

Figs. 11, 12 and 13 are fragmentary detail perspective views of an upper portion of the inner, intermediate and outer garment sections respectively.

Figs. 14, 15 and 16 are detail views of one of the thermostats.

Fig. 17 is a vertical section on an enlarged scale taken on the line 17—17 of Figure 1 through the box for the control means; the switch, rheostat and transformer being shown in side elevation.

Fig. 18 is a schematic diagram of the electric circuit, the switching and control means, and the transformer.

While a preferred embodiment of the invention is illustrated in the drawings, it will of course be understood that minor changes and modifications may be made in the particular construction shown and the invention may be embodied in other forms as will appeal to those skilled in the art and falling within the scope of the appended claims, without departing from the spirit of the invention.

Referring to a detail description of the particular embodiment of the invention illustrated in the drawings, the construction of sleeve and hand covering shown comprises three telescoping sections 19, 20 and 21. The intermediate section 19, as shown in Figures 7 and 8 of the drawings, has a hand covering extension 19$^a$ that is open at the palm side at 19$^b$. This intermediate section is constructed with double walls 19$^c$, 19$^d$ formed by sheets of waterproof material arranged face to face and connected at their marginal portions to provide therebetween a moisture tight protective casing for the heating unit. The intermediate section is preferably constructed of a material known by the trade-name "Neoprene cloth" and which is waterproof, is resistant to all kinds of fluids commonly used for medicinal purposes, is highly resistant to the relatively high temperatures normally used in different kinds of heating devices, and will not vulcanize or harden as sheet rubber covers will.

The heating unit is made up of a pair of conductor members 22 and 23, each bent back and forth to form a longitudinal series of transverse loops and the looped members being reversely arranged in overlapping relation to form a strip like structure designated A, with the end bend portions of the loops of one conductor member disposed between end bend portions of the loops of the other conductor member, this construction being shown in Figure 6 of the drawings.

The conductor strip A is attached to a flexible supporting sheet 24 of fabric arranged between the walls 19$^c$, 19$^d$ of the intermediate section 19 and secured at marginal portions thereof to marginal portions of said walls by the stitching 25 which units marginal portions of the walls 19$^c$, 19$^d$ of the intermediate section to form the protective casing. As shown in Figures 7 and 8, in the seaming of the parts together, the marginal portions of the sheets 19$^c$, 19$^d$ are turned in and the marginal portions 24$^a$ of the supporting sheet 24 is secured between the turned in marginal portion of the sheet 19$^d$ and the adjoining portion of said sheet.

In Figure 5 of the drawings, the supporting sheet 24 for the heating unit is shown opened out flat with the heating unit attached thereto, to illustrate the exact positioning of the conductor strip A. As shown in this view, the conductor strip is laid on the supporting sheet in a series of longitudinal convolutions $b$ so that when the supporting sheet is incorporated in the structure of the intermediate section 19, it will extend over the arm and over the back of the hand and the backs of the fingers. The conductor strip is anchored to the supporting sheet 24 by parallel rows of stitching $c$, $c'$. The sheets 19$^c$, 19$^d$ are of the same general configuration as the supporting sheet 24, and in securing the supporting sheet between the sheets 19$^c$, 19$^d$ it is laid between the same so that in forming the sleeve, the fold or bend of the supporting sheet will be substantially along the line $e$—$e$ of Figure 5, the conductor wires of the heating unit being disposed at the inner side of the supporting sheet.

An end section of the conductor strip is brought back transversely along the upper marginal portion of the supporting sheet so that both end portions $d$, $d'$ of the conductor strip will be located at the upper left hand corner portion of the sheet where they are suitably secured thereto. The end portions of the conductor strip are connected with lead wires 26 and 27 of a short flexible cord 28 extending to the exterior of the intermediate section 19 and having a terminal connecting plug 28$^a$.

The conductor members 22 and 23 constituting the conductor strip A each consists of a plurality of thin, easily flexible, insulated wires 22$^a$ and 23$^a$. In the particular exemplification of the invention illustrated in the drawings, the conductor members 22, 23 each comprises two of such insulated conductors composed of No. 38 metal core yarn, but, as will be understood in practicing the invention, the size and number of the component wires will vary, depending upon the heat desired. The insulated wires 22$^a$, 23$^a$ are formed by threads of the construction disclosed in Patent No. 1,965,542 issued to William Colvin, Jr., July 3, 1934, composed partially of wire and partially of textile fibers, but which are endowed with characteristics of softness, flexibility, and resistance to kinking, fairly comparable to like threads composed entirely of textile fiber, the metal wire core of the composite thread constituting the conductor wire of the heating unit, and the textile fiber wrappings of the composite thread forming the insulation of the conductor wire.

The garment is provided with temperature control means shown as comprising two thermostats 29 and 30, which are connected in series with each other and with the conductor strip A, the thermostats being interposed in a short conductor wire 31 leading from the terminal $d$ of the conductor strip to the lead wire 27 of the flexible cord 28. The thermostats are of conventional construction. The detail construction and arrangement of the same is shown in Figs. 14, 15 and 16. Each thermostat comprises a bimetallic bar 32 rigidly secured at one end upon a thin flat base 33 of electric insulating material and adapted to engage at its free end with a fixed contact 34 on the base. Each thermostat has a terminal 35 that is in electrical contact with the bimetallic bar 32, and with a terminal 36 that is in contact with the fixed contact 34, said terminals being connected in the conductor 31. 37 designates a cover member or shield of general U-shape form in cross section secured to opposite sides of the base 33. The structure is enclosed in a wrapper 38 of electric insulating tape or cloth and each thermostat is disposed lengthwise longitudinally of the transversely looped conductor strip A with its base 33 directly against a section of the looped strip. The thermostats are conveniently secured to the supporting sheet 24 by cord or thread 39 extending around the same and through the supporting sheet. Both thermostats are set to operate at the same temperature, two being provided at different locations along the conductor strip for increased safety in the operation of the garment. When the thermostatic bar of each thermostat is heated, it will flex out of engagement with the fixed contact, breaking the circuit.

When the bar cools slightly it will again engage the fixed contact. The particular construction of the transversely looped heating unit strip in conjunction with the thermostats laid directly against the closely associated loops of a section of the same, provides for radiation of a sufficient amount of heat around the thermostatic bars to insure heating of the bars to the same degree and at the same rate as the garment is heated and to effect a close control to maintain the garment at a constant predetermined temperature. It will be noted that this is accomplished by an arrangement of parts of a simple, practical nature, no auxiliary heating coil enclosed within the casing of the thermostat is required. The construction is simple and can be easily manufactured and assembled. The transversely looped type of conductor strip aside from the important advantage flowing from the special arrangement of the same with the thermostats, has the advantages of providing considerable heating structure within relatively restricted areas of the garment. At the same time it will not offer any appreciable resistance to movements of the hand or fingers and is not liable to be broken by stretching of portions of the garment when applying or removing the same.

Referring now particularly to Figures 3, 7, 8, and 9 of the drawings, 19e designates a finger pocket at the lower end of the hand covering 19a of the intermediate section at the palm side, said pocket being formed by a segmental shaped piece of fabric stitched along its curved edge portion to the lower curved marginal portion of the hand covering 19a, as shown. The piece of fabric that forms the finger pocket is preferably made of waterproof material similar to that used in the construction of the intermediate section.

The inner lining section 20, which contacts directly with the arm and hand, and the outer covering section 21 are made of khaki or like material. These sections are provided with thumb pockets designated respectively 20a, 21a. The thumb pockets are of the reversible type projecting laterally from one side edge of the sections adapted to fit on either hand. The thumb pockets telescope with each other, the thumb pocket 20a of the inner section projecting through the opening 19b at the palm of the intermediate section adjacent the transversely extending edge portion 19f at the upper edge of the opening. This interfitting of the parts in conjunction with the lower finger pocket 19e of the intermediate section 19 acts to hold the hand covering portion 19a thereof with the heating means therein in proper position relatively to the back of the hand when the garment is being worn. As will be appreciated, with the hand covering of the double-walled intermediate section 19 open at the palm side, excessive thickness of material at the palm is avoided while at the same time as previously explained provision is made for maintaining the hand covering portion 19a in proper position over the back of the hand. The sleeve sections are provided at their upper portions with means for detachably connecting the intermediate section 19 to the inner lining section 20, and the latter to the outer covering section 21. The means for this purpose comprises sets of cooperating snap fastener members arranged at intervals about the upper end portions of the sections. 40 designates the fastening members at the inner side of the intermediate section 19 cooperating with fastening members 41 on the inner lining section 20, and 42, 43 are cooperating fastening members on the inner lining section and the outer covering section respectively.

The upper portion of the outer covering section 21 extends beyond the upper ends of the intermediate and inner sections, and is provided with an elastic band 44 within a casing 45 extending around the same. The elastic band serves to secure the upper portion of the outer section around the arm and hold it in place on the arm. As will be understood, through the detachable interconnections of the upper portions of the sections, the elastic band acts to hold the intermediate and inner lining sections in place on the arm as well as the outer covering section, and the elastic band together with the sets of snap fasteners also cooperates with the finger pocket 19e of the intermediate section and the interfitting thumb pockets of the inner and outer sections to maintain the hand covering portion of the intermediate section with the heating unit in proper position over the back of the hand. By separating the sets of snap fastening members 40, 41, and 42, 43, the inner lining section 20 and outer covering section 21 can be readily removed for laundering and also for adjusting the intermediate section to reverse the palm side thereof so that the garment may be used on either hand and arm.

Provision is made for operating the heating unit of the garment at a relatively low voltage from the regular service circuit of 110 volts usually found in dwellings and hospitals. A transformer is provided to step down the ordinary service circuit to approximately 16 volts. A rheostat is also employed to compensate for small variations in voltage and to make slight adjustments in the temperature of the heating unit. The step-down voltage transformer, rheostat and control switch illustrated in the drawings, are each of well known conventional construction and will only be referred to in a general way. They are conveniently arranged in a box 46.

Referring particularly to Figures 17 and 18 of the drawings, 47 designates the transformer, 48 the rheostat and 49 is the control switch. The rheostat and switch are operated by a knob 50. 51 is a flexible conductor tube or cord having a terminal connector plug 52 adapted to be inserted into the ordinary wall socket, said conductor tube or cord extending into the control box 46 and its conductors 53 and 54 leading respectively to the transformer 47 and the rheostat 48. 55 is a short conductor connecting the transformer to a contact of the switch 49, the rheostat and switch being connected in the primary circuit of the transformer. 56 and 57 are conductors leading from the secondary of the transformer to a connector socket 58 into which the terminal plug 28a of the cord connection 28 of the garment is inserted. As will be understood, by rotating the control knob 50 clockwise from "off" position, the switch 49 will first be operated to close the circuit. Continued movement of the knob 50 will gradually cut out the resistance coils of the rheostat and thereby gradually increase the temperature of the heating unit.

By the particular construction and arrangement of parts hereinbefore set forth, an efficient, safe, satisfactory electrically heated sleeve and hand covering is provided. The device provides for advantageously applying the desired heat over the arm and hand. It permits freedom of movement of the hand and fingers so that it may be worn for relatively unlimited periods without discomfort.

The heating unit is well protected, objectionable thickness of material at the palm of the hand is avoided providing for easy flexing of the hand, coupled with considerable saving of material in the manufacture of the double-walled waterproof section, while at the same time through the special interfitting of the parts and the other attaching means provided, the intermediate section with the contained heating unit will be held in proper position so that the heat will be applied as desired, and the sections being easily separated for laundering of the inner lining section and outer covering section, and also for reversing the hand covering of the intermediate section so that the garment may be worn on either hand and arm.

What we claim is:

1. An electrically heated sleeve and hand covering comprising an intermediate sleeve and hand covering section, an inner lining sleeve and hand covering section provided with a thumb pocket, an outer covering sleeve and hand covering section having a thumb pocket similar to the thumb pocket of the inner section, said intermediate section being constructed with double walls to provide a closed protective casing therebetween, and an electric heating unit disposed within said protective casing, the hand covering portion of the intermediate section being formed open at the palm side and being provided at that side with a finger pocket at the lower end thereof, the sections telescoping with each other, the thumb pocket of the inner section projecting through the opening at the palm side of the hand covering portion of the intermediate section and telescoping with the thumb pocket of the outer covering section.

2. An electrically heated sleeve and hand covering comprising an intermediate sleeve and hand covering section, an inner lining sleeve and hand covering section provided with a thumb pocket, an outer covering sleeve and hand covering section having a thumb pocket similar to the thumb pocket of the inner section, said intermediate section being constructed with double walls to provide a closed protective casing therebetween, a flexible fabric sheet disposed within said casing and secured at marginal portions thereof between marginal portions of the opposing walls of the intermediate section, and an electric heating unit secured to said sheet and comprising conductor wires arranged in a series of longitudinal convolutions to extend along the sleeve and hand covering, the hand covering portion of the intermediate section being formed open at the palm side and provided at that side with a finger pocket at the lower end thereof, the sections telescoping with each other, the thumb pocket of the inner section projecting through the opening at the palm side of the intermediate section and telescoping with the thumb pocket of the outer section.

3. An electrically heated sleeve and hand covering comprising an intermediate sleeve and hand covering section, an inner lining sleeve and hand covering section provided with a thumb pocket projecting laterally from a side edge thereof, an outer sleeve and hand covering section having a thumb pocket projecting from a side edge thereof similar to the thumb pocket of the inner section, said intermediate section being constructed with double walls to provide a closed protective casing therebetween, and an electric heating unit disposed within said protective casing, the hand covering portion of the intermediate section being formed open at the palm side and provided at that side with a finger pocket at the lower end thereof, the sections telescoping with each other, the thumb pocket of the inner section projecting through the opening at the palm side of the intermediate section and telescoping with the thumb pocket of the outer section.

4. An electrically heated sleeve and hand covering comprising an intermediate sleeve and hand covering section, an inner lining sleeve and hand covering section provided with a thumb pocket projecting laterally from one side edge thereof, an outer sleeve and hand covering section having a thumb pocket projecting from one side edge thereof similar to the thumb pocket of the inner section, said intermediate section being constructed with double walls to provide a closed protective casing therebetween, and an electric heating unit disposed within said protective casing, the hand covering portion of the intermediate section being formed open at the palm side and provided at that side with a finger pocket at the lower end thereof, the sections telescoping with each other, and the thumb pocket of the inner section projecting through the opening at the palm side of the intermediate section near to the upper edge portion thereof at the upper edge of said opening and fitting into the thumb pocket of the outer covering section.

5. An electrically heated sleeve and hand covering comprising an intermediate sleeve and hand covering section constructed with double walls to provide a closed protective casing therebetween, an electric heating unit disposed within said protective casing, an inner lining sleeve and hand covering section, an outer sleeve and hand covering section, said sections telescoping with each other, means located at intervals about upper end portions of the sections for detachably securing the intermediate section to the inner lining section, and the latter to the outer section, the upper end portion of the outer section extending over and beyond the upper ends of the intermediate and inner sections, and an elastic band around said upper end portion of the outer section to secure said section around the arm and hold it and the intermediate and inner sections in place on the arm.

6. An electrically heated sleeve and hand covering comprising an intermediate sleeve and hand covering section, an inner lining sleeve and hand covering section provided with a thumb pocket, an outer covering sleeve and hand covering section having a thumb pocket similar to the thumb pocket of the inner section, said intermediate section being constructed with double walls to provide a closed protective casing therebetween, an electric heating unit disposed within said protective casing, the hand covering portion of the intermediate section being formed open at the palm side and being provided at that side with a finger pocket at the lower end thereof, the sections telescoping with each other, means located at intervals about upper end portions of the sections for detachably securing the intermediate section to the inner section, and the latter to the outer section, the upper end portion of the outer section projecting over and beyond the upper end portions of the intermediate and inner sections, and an elastic band around said upper end portion of the outer section to secure it around the arm and hold the same and the intermediate and inner sections in place on the arm.

7. An electrically heated sleeve and hand covering comprising an intermediate sleeve and hand covering section constructed with double walls to provide a closed protective casing therebetween, an electric heating unit disposed within said protective casing, an inner lining sleeve and hand covering section, an outer sleeve and hand covering section, said sections telescoping with each other, means located at intervals about upper end portions of the sections for detachably securing the intermediate section to one of said other sections, and for detachably securing the inner lining section to the outer section, the upper end portion of the outer section extending over and beyond the upper ends of the intermediate and inner sections, and an elastic band around said upper end portion of the outer section to secure said section around the arm and hold it and the intermediate and inner sections in place on the arm.

MILTON F. JOY.
ERNEST E. SHEPARDSON.